US009049038B2

(12) United States Patent
Cavalcanti

(10) Patent No.: US 9,049,038 B2
(45) Date of Patent: Jun. 2, 2015

(54) METHOD OF ASSOCIATING OR RE-ASSOCIATING DEVICES IN A CONTROL NETWORK

(75) Inventor: Dave Alberto Tavares Cavalcanti, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 179 days.

(21) Appl. No.: 13/500,952

(22) PCT Filed: Oct. 8, 2010

(86) PCT No.: PCT/IB2010/054559
§ 371 (c)(1),
(2), (4) Date: Apr. 9, 2012

(87) PCT Pub. No.: WO2011/045719
PCT Pub. Date: Apr. 21, 2011

(65) Prior Publication Data
US 2012/0203841 A1    Aug. 9, 2012

(51) Int. Cl.
*G06F 15/16*    (2006.01)
*H04L 12/28*    (2006.01)
(Continued)

(52) U.S. Cl.
CPC ........ *H04L 12/2807* (2013.01); *G05B 19/4185* (2013.01); *H04L 12/244* (2013.01);
(Continued)

(58) Field of Classification Search
USPC ................................. 709/226, 204
See application file for complete search history.

(56) References Cited

U.S. PATENT DOCUMENTS 5,574,870 A * 11/1996 Dziennus et al. ............. 710/305
2006/0067295 A1 * 3/2006 Lehotsky et al. ............. 370/351
(Continued)

FOREIGN PATENT DOCUMENTS

WO    2006095317 A1    9/2006
WO    WO 2006095317 A1 *    9/2006
(Continued)

*Primary Examiner* — Vivek Srivastava
*Assistant Examiner* — Hermon Asres

(57) ABSTRACT

This invention relates to a method of associating or re-associating devices in a control network including control zones to respective zone controllers (ZCs) controlling the control zones. In a first step, an associating or re-associating timer (ZC_REASSC_TIMER) window is initialized at the (ZCs) defining the time during which said associating or re-associating of the devices takes place. In a second step, during the (ZC_REASSC_TIMER) window zone specific information (ZN_SPEC) message sage is transmitted, the (ZN_SPEC) message including information about the devices expected to be in the zones controlled by the (ZCs). In a third step, it is compared whether the zone specific information contained in the (ZN_SPEC) received by the devices includes device specific information that match with local device specific information associated to the devices. In case the comparing results in that a pre-defined matching criteria is fulfilled an association or re-association request message (RA_REQ) is sent from the devices to the zone controllers (ZCs) where the pre-defined matching criteria was met. The (RA_REQ) message including device description parameters and indicates a request from the devices to join the control zones controlled by said (ZCs). Finally, it is determined whether the association or re-association of the respective devices is to be confirmed by means of comparing, by the respective (ZCs) receiving the (RA_REQ) message, the device description parameters included in the (RA_REQ) message match with zone specific information included in the (ZN_SPEC).

15 Claims, 3 Drawing Sheets

(51) Int. Cl.
   *G05B 19/418*   (2006.01)
   *H04L 12/24*    (2006.01)
   *H04W 8/00*     (2009.01)
   *H04W 84/20*    (2009.01)
   *H05B 37/02*    (2006.01)
   *H04L 29/08*    (2006.01)
   *H04L 29/06*    (2006.01)
   *H04W 48/20*    (2009.01)
   *H04W 84/18*    (2009.01)

(52) U.S. Cl.
   CPC ......... *H04L12/2838* (2013.01); *H04L 41/0806* (2013.01); *H04W 8/005* (2013.01); *H04W 48/20* (2013.01); *H04W 84/18* (2013.01); *H04W 84/20* (2013.01); *H05B 37/0245* (2013.01); *H04L 67/303* (2013.01); *H04L 67/125* (2013.01); *H04L 67/12* (2013.01); *H04L 67/18* (2013.01); *H04L 69/28* (2013.01)

(56) References Cited

U.S. PATENT DOCUMENTS

| | | | |
|---|---|---|---|
| 2007/0177613 A1* | 8/2007 | Shorty et al. | 370/401 |
| 2007/0232288 A1 | 10/2007 | McFarland et al. | |
| 2008/0298302 A1 | 12/2008 | Ishida | |
| 2009/0026966 A1 | 1/2009 | Budde et al. | |
| 2009/0045971 A1 | 2/2009 | Simons et al. | |

FOREIGN PATENT DOCUMENTS

| | | |
|---|---|---|
| WO | 2007036886 A2 | 4/2007 |
| WO | 2007138494 A1 | 12/2007 |
| WO | 2008001267 A2 | 1/2008 |

* cited by examiner

METHOD OF ASSOCIATING OR RE-ASSOCIATING DEVICES IN A CONTROL NETWORK

FIELD OF THE INVENTION

The present invention relates to associating or re-associating devices in a control network including control zones to respective zone controllers (ZCs) controlling the control zones.

BACKGROUND OF THE INVENTION

Commissioning of communication networks for control and automation in buildings is a challenging problem and it adds extra cost to the deployment of overall control and automation applications. Although wireless radios provide more flexibility and eliminates the need for wiring, it still requires installers to follow complicated manual procedures to commission the network. Typically, commissioning of large-scale deployments (e.g. commercial buildings) require specialists to perform a commissioning procedure and existing commissioning solutions are based on tools that are carried by the installer and are used to manually register/associate devices with controller, input location information, input device address/name, and adjust other operational parameters.

WO2006095317 describes an auto-commissioning method for building systems based on device location information and the building service plan. The method involves three stages. First, devices power up, form the network and use known radio frequency (RF)-based localization techniques to identify their locations. The devices locations are used to generate a device position map, which is stored at a central controller, also called, Building Management System (BMS). Then, in the next stage the map of devices is compared to the building service plan, which may be pre-defined and stored at the BMS. In this way the BMS obtains configuration data and verifies whether the expected devices are indentified in the device map at their expected position. As the last stage, the BMS sends configuration commands to the devices to complete the final association part of the auto-commissioning procedure. The commands sent by the BMS during the association are necessary to ensure the controllable devices are under the control of the right controller and other devices (e.g. sensors) have the right configuration parameters (destination address, sampling rate, reporting mode, etc). Accordingly, this is a centralized approach were all the operations to complete the association procedure are handled by the BMS.

WO 2008/001267 discloses a related commissioning method for local control networks in which a controller device is responsible for admitting devices within a local (restricted room/area/zone) network and configuring the control application. The proposed method in WO 2008/001267 is also based on existing localization techniques to identify devices' positions (e.g. Radio-Frequency (RF), Infra-Red (IR), and visual lighting based techniques). Furthermore, the controller collects information from local devices (type, capabilities, etc) and commissions the area/zone based on the collected information. The local (room/zone/area) controller may also communicate with a master controller or BMS and it may perform re-configuration of the network. In the method proposed in WO 2008/001267, the final stage of the commissioning procedure happens locally between the controlled and other devices.

The most advanced auto-commissioning systems today are semi-automatic, i.e., they require some form of manual input to commission every device. This results in high installation costs, and contributes to the idea that wireless building control/automation is a complex and costly technology. Currently, there is no completely automatic (or plug-and-play) commissioning solution for large-scale control systems, in which the devices (sensors, controllers, switches, etc.) automatically executes an commissioning procedure once powered up and establish the right association and network connections needed. One of the key problems with prior art systems is how to create control zones, associate devices (sensors/actuators) with their intended controller (ZC) and set up operational parameters for the network and applications with minimal or possibly no user intervention.

Although WO2006095317 and WO 2008/001267 address somewhat the auto-commissioning problem, the inventor of the present invention has appreciated that the last stage of the commissioning procedure, namely the final association of devices within control zones/area is not addressed in these references and an improved method and a system of associating or re-associating devices in a control network is of benefit, and has in consequence devised the present invention.

SUMMARY DESCRIPTION OF THE INVENTION

The object of the present invention is to overcome the above mentioned drawbacks by providing a method of associating or re-associating devices in a control network in order to auto-configure applications and control zones in a distributed fashion, handling localized device errors as well as communication failures.

According to a first aspect the present invention relates to a method of associating or re-associating devices in a control network including control zones to respective zone controllers (ZCs) controlling the control zones, comprising:

initializing an associating or re-associating timer (ZC_REASSC_TIMER) window at the (ZCs) defining the time during which said associating or re-associating of the devices takes place;

transmitting during the (ZC_REASSC_TIMER) window zone specific information (ZN_SPEC) message, the (ZN_SPEC) message including information about the devices expected to be in the zones controlled by the (ZCs), comparing whether the zone specific information contained in the (ZN_SPEC) received by said devices includes device specific information that match with local device specific information associated to the devices, where in case the comparing results in that a pre-defined matching criteria is fulfilled;

sending an association or re-association request message (RA_REQ) from said devices to the zone controllers (ZCs) where said pre-defined matching criteria was met, the (RA_REQ) message including device description parameters and indicates a request from the devices to join the control zones controlled by said (ZCs), and determining whether the association or re-association of the respective devices is to be confirmed by means of comparing, by the respective (ZCs) receiving said (RA_REQ) message, the device description parameters included in the (RA_REQ) message match with zone specific information included in the (ZN_SPEC).

Accordingly, a new completely automatic (or plug-and-play) association or re-association procedure is provided for large-scale control system that specifies the association or re-association protocol and devices behavior during the last stage of commissioning of a control network. It is thus possible to create control zones, associate or re-associate devices (sensors/actuators) with their intended controller (ZC) and set up operational parameters for the network and applications with minimal or possibly no user intervention.

In one embodiment, the step of determining whether the association or re-association of the respective devices is to be confirmed includes checking whether the devices that responded to said (ZN_SPEC) message are indeed the devices expected to be in the zones controlled by the (ZCs), wherein in case said devices do not correspond to the devices expected to be in the zones controlled by the (ZCs) when the (ZC_REASSC_TIMER) expires said timer (ZC_REASSC_TIMER) window is re-initialized and a subsequent associating or re-associating process is performed, the method further comprising initializing a counter (ZC_REASSC_COUNTER) for counting the number of times said timer (ZC_REASSC_TIMER) window opened. Thus, in case not all the devices are successfully commissioned the (ZC_REASSC_TIMER) window is re-opened and said associating or re-associating is repeated. This enables the (ZC) to expand the association or re-association window to allow any missing devices to properly associate or re-associate with the (ZC). By initializing the counter (ZC_REASSC_COUNTER) it is possible to keep track of the number of times the re-association window is opened before all devices are successfully commissioned.

In one embodiment, said step of checking whether the devices that responded to said (ZN_SPEC) message are indeed the devices expected to be in the zones controlled by the (ZCs) comprises:
   comparing device identifiers associated to the (RA_REQ) message that uniquely identifies the devices match with a pre-defined list of device identifiers associated to the respective (ZCs), or
   comparing device identifiers associated to the (RA_REQ) message that uniquely identifies the devices match with zone specific information associated to the respective (ZCs),
   checking whether the type, capabilities and location information of the device associated to the (RA_REQ) message matches zone specific information associated to the respective (ZCs), or
   counting the number of a given type and comparing the number of a number of devices of the same type expected to be zones, or
a combination thereof.

As an example, one way is counting the number of devices of a given type is e.g. when a (ZC) expects two light sensors. When the two devices of the type="light sensor" confirms association the (ZC) can stop the window, otherwise it can re-start the (ZC_REASSC_TIMER) window. The (ZC) may also use the location information of the devices (e.g. light sensors) with configuration information stored at the Building Management System (BMS) to confirm whether the associating devices are the expected devices. As an example, the (ZC) may expect two light sensors to be located at location="X" and location="Y". If these two locations are detected the (ZC) can stop the window, otherwise it can re-start the (ZC_REASSC_TIMER) window.

In one embodiment, the method further comprises defining a maximum counter number (MAX_REASSC_RETRIES), where in case said (ZC_REASSC_COUNTER) exceeds (MAX_REASSC_RETRIES) the process of associating or re-associating devices is terminated. This enables the ZC to indentify commissioning errors in case devices do not successfully associate or re-associate within a given number of association windows specified by the MAX_REASSC_RETRIES counter.

In one embodiment, in case the (ZC_REASSC_COUNTER) exceeds (MAX_REASSC_RETRIES) and the expected devices to be in the zone have not successfully associated the respective (ZCs), the (ZCs) assume a commissioning error has occurred and report the error code to the BMS and/or indicate to a user that an error has occurred. Accordingly, at this stage the error information include the information about the specific devices that are expected but which did not successfully associated. The error may be indicated to a user via e.g. sound or blinking LED so as to help the user to identify the error situation. At this stage the respective (ZC) may return to said steps or it may wait for commands from the BMS in order to fix the commissioning problem. Such commands my change its control zone configuration, for instance. The error may be due to problems in the zone configuration information, which could be changed as a result of such commands.

In one embodiment, the step of initializing an associating or re-associating timer (ZC_REASSC_TIMER) window is performed periodically so as to allow new devices to associate or existing device to re-associate. This could be an advantage when e.g. devices have lost contact with the respective (ZCs) where the contact is re-established at some later time and when new devices are introduced into the control system.

In one embodiment, said devices collect for a time period (ZC_SCAN_TIME) all received (ZN_SPEC) messages prior to said step of comparing whether the zone specific information contained in the (ZN_SPEC) received by said devices includes device specific information that match with local device specific information associated to the devices. This comparing can be done based on the zone specification information received and the devices own local information. For instance, if a light sensor at a given position (x, y) receives a (ZN-SPEC) indicating the (ZC) is expecting a light sensor at position (x, y) to join the network, the sensor should select that given (ZC) to continue the re-association. The (ZC_SCAN_TIME) may be configurable for each case but in general, it should be at least the interval the (ZC) uses to open the association window periodically. In this way, the scanning device will at least receive one (ZC_SPEC) message. It should be noted that if application requires a fast re-association (e.g. after dropping a connection), the device could choose to go directly to the active re-association mode.

In one embodiment, if a given device does not receive any (ZN_SPEC) messages within said (ZC_SCAN_TIME) period it broadcasts an association or re-association request message (RA_REQ) message including its own device specific information. This is an active way of searching for its (ZC), in case the waiting for reception of any (ZN_SPEC) messages does not provide positive results. After sending a broadcast (RA-REQ), the device may go back to the scanning step to collect any potential (RA-RSP) from (ZCs) in the area.

In one embodiment, the method further comprises issuing and sending a confirming or non-confirming message (RA_RSP) by the (ZCs) to the respective devices that previously sent the (RA_REQ) message to the (ZCs) indicating whether the respective devices are confirmed or not, where in case the respective devices are confirmed they respond by issuing an acknowledgement message (DEV_ACK) and send it back to the respective (ZCs) issuing said (RA_RSP).

In one embodiment, in case the (DEV_ACK) is not received within a given time (DEV_ACK_TIMEOUT), the (ZC) assumes the re-association process for that specific device failed. The (ZC) is thus able to confirm whether the association was successful and take action in case it was not.

In one embodiment, in case the respective devices are not confirmed within a given time (DEV_TIMEOUT) by the respective (ZCs) they re-transmit said (RA_REQ) up to a maximum number of times (MAX_REASSC_RETRY). This will increase the robustness of the procedure against potential data losses due to reliability issues in the communication medium (e.g. interference from neighboring transmissions from the same or different networks).

In one embodiment, the devices initialize a device associating or re-associating timer (DEV_REASSC_TIMER) window and a counter (DEV_REASSC_COUNTER), the (DEV_REASSC_TIMER) indicating an association or re-association time window at the device side and the (DEV_REASSC_COUNTER) indicates the number of times the (DEV_REASSC_TIMER) window is initialized, said step of collecting for the time period (ZC_SCAN_TIME) all received (ZN_SPEC) messages and following association attempt including transmission of (RA_REQ) being repeated while (DEV_REASSC_COUNTER) is less than said (MAX_REASSC_RETRY). This allows the device to overcome potential communication errors while receiving (ZC_SPEC) messages or confirmation messages from the ZC (RA_RSP) by extending its association window in order to identify the right (ZC) to associate with. This method can be used with minimal transmission overhead, by just scanning the channel for additional time windows in order to find the right (ZC) to associate with.

In one embodiment, if said (DEV_REASSC_COUNTER) becomes greater that said (MAX_REASSC_RETRY) for a given device selected from said devices and the device has not yet successfully associated with a (ZC), an association or re-association error message (ASSC_ERROR) is issued and associated to a request message (RA_REQ), where the (RA_REQ) and the associated (ASSC_ERROR) message is either sent to a selected zone controller (ZC) or is sent as a broadcast if no (ZC) is known, where in case the selected (ZC) from said associating device or any other (ZC) receives said (RA_REQ) and (ASSC_ERROR) message, the (ZC) grants a temporary association or re-association to said device and sends a message indicating a temporal association or re-association (TEMP_GRANT) to said associating device, said error message (ASSC_ERROR) further being sent to a Building Management System (BMS) for notifying about said error. This allows the associating device to indentify commissioning and system configuration errors when it cannot successfully identify its intended zone specific information using the previous steps. By identifying the problem, the device can initiate a process to recover from the error and achieve successful association. This also allows the BMS to identify and solve association errors due to potential errors in the system configuration information. Said successfully associated with a (ZC) may include receiving a confirmation of association by a (ZC) in the format of a confirmed association response message (RA_RSP).

According to another aspect, the present invention relates to a computer program product for instructing a processing unit to execute the above mentioned method steps when the product is run on a computer.

According to yet another aspect, the present invention relates to a system for associating or re-associating devices in a control network including control zones to respective zone controllers (ZCs) controlling the control zones, comprising:

a timer for initializing an associating or re-associating timer (ZC_REASSC_TIMER) window at the (ZCs) defining the time during which said associating or re-associating of the devices takes place;

a transmitter for transmitting during the (ZC_REASSC_TIMER) window zone specific information (ZN_SPEC) message, the (ZN_SPEC) message including information about the devices expected to be in the zones controlled by the (ZCs), a processor for comparing whether the zone specific information contained in the (ZN_SPEC) received by said devices includes device specific information that match with local device specific information associated to the devices, where in case the comparing results in that a pre-defined matching criteria is fulfilled;

a transmitter for sending an association or re-association request message (RA_REQ) from said devices to the zone controllers (ZCs) where said pre-defined matching criteria was met, the (RA_REQ) message including device description parameters and indicates a request from the devices to join the control zones controlled by said (ZCs), and a processor for determining whether the association or re-association of the respective devices is to be confirmed by means of comparing, by the respective (ZCs) receiving said (RA_REQ) message, the device description parameters included in the (RA_REQ) message match with zone specific information included in the (ZN_SPEC).

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
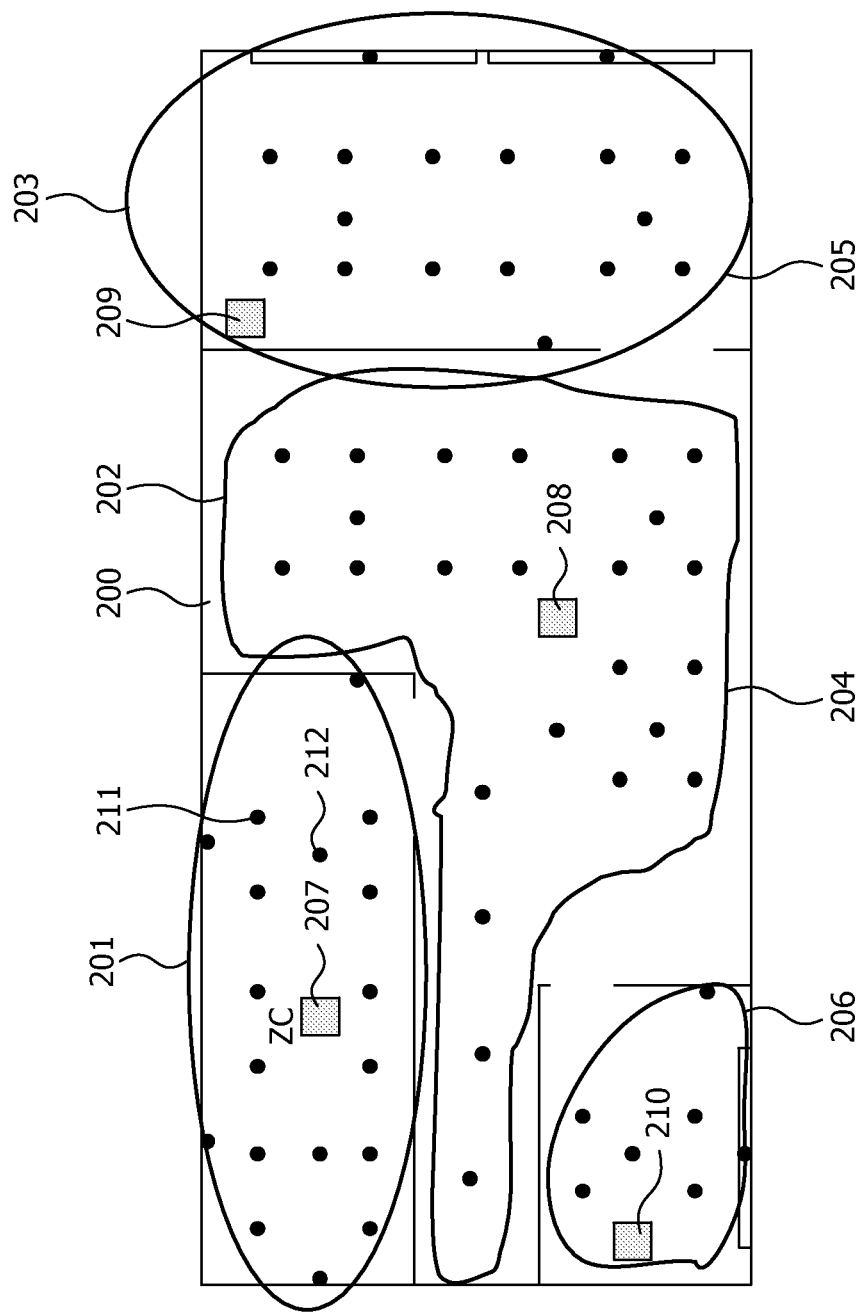
FIG. 1 depicts graphically the concept of control zones associated to an area showing zone controllers (ZCs) that are responsible for executing control algorithms, configuring and managing the other devices within a given control zone.

FIG. 1 depicts graphically the concept of control zones 201-206 associated to an area 200, showing zone controllers (ZCs) 207-210 that are responsible for executing control algorithms, configuring and managing the other devices within a given control zone. As an example, zone controller (ZC) 207 manages all the devices 211-212 (solid dots) within the control zone 201. An example of such devices is sensors (e.g. photo-sensors, occupancy-sensors, temperature-sensors, and humidity sensors), actuators (e.g. heater, window blinds/shades, lighting), control and management equipment (e.g. control station, controllers) and performance measurement equipment such as energy meters. Such zone controllers (ZCs) are typically adapted to execute localized control over variables that can be controlled at the user level, e.g. integrated lighting, daylight, Heating Ventilation and Air Conditioning (HVAC) and blind control in a small office room.

The control zones 201-206 may be defined by using known methods disclosed in WO2006095317 and WO 2008/001267, hereby incorporated in whole by reference. Moreover, it is assumed that the (ZCs) have access to the required localization information to finalize said association or re-association process. The remaining devices waiting to complete the association may also have their own location information and capabilities. Furthermore, it may be assumed that the devices may be able to communicate with other devices on the network, even though they may have not completed the association or re-association process.

After devices location information as well as control zone coordinates are available (e.g. control zone information may be stored at the (ZCs) or at the Building Management System (BMS), the devices may confirm or change their association with a (ZC) based on their location, capabilities and the control zones specification provided by the user, which may be a control system designer. This may be referred to as re-association and its main purpose is to verify/confirm devices association and configure (or re-configure) the application-defined control zones. This process also handles possible communication as well as device errors and ensures all devices are properly commissioned, or that open problems are reported at the end of this procedure. The re-association procedure involves a communication protocol for message exchanges between (ZCs) and other devices and the behavior for (ZCs) and devices.

Figure 2:
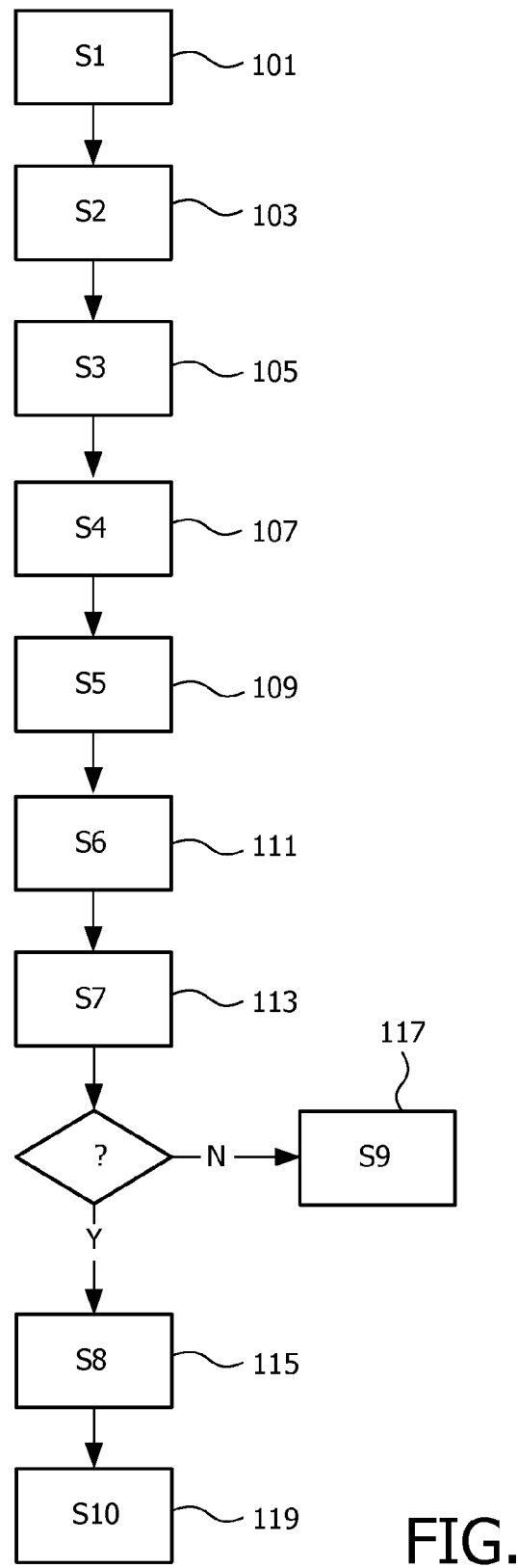
FIG. 2 shows a flowchart of an embodiment of a method according to the present invention of associating or re-associating devices in a control network.

FIG. 2 shows a flowchart of an embodiment of a method according to the present invention of associating or re-associating devices in a control network including control zones to respective zone controllers (ZCs) controlling the control zones.

In a first step (S1) 101, an associating or re-associating timer (ZC_REASSC_TIMER) window is initialized at the (ZCs), where the (ZC_REASSC_TIMER) window defines the time during which said associating or re-associating of the devices takes place.

In step (S2) 103, during this (ZC_REASSC_TIMER) window zone specific information (ZN_SPEC) message is transmitted, where the (ZN_SPEC) message includes information about the devices expected to be in the zones controlled by the (ZCs). The message can be a broadcast over a limited range or a local broadcast (i.e. does not propagate over the entire network). The zone specific information (ZN_SPEC) message may further include the types of devices expected to be in a control zone (e.g. photo-sensors, occupancy-sensors or temperature-sensors) along with their corresponding expected locations and other configuration parameters (e.g. reporting rate for sensors, power save operation, re-association window period, etc). Thus, this (ZN_SPEC) message indicates to the other devices that the (ZC) is opening the re-association window. By the term "expected to be in the control zone" is meant that the (ZCs) may be pre-set with a number of devices of specific types and at specific locations that are expected to be under the (ZC's) control. This kind of information may be stored locally at the (ZC) at the moment the (ZC) is installed or it may be retrieved from the Building Management System (BMS).

In step (S3) 105, a comparing is performed where it is compared whether the zone specific information contained in the (ZN_SPEC) received by the devices includes device specific information that match with local device specific information associated to the devices. As an example, if a given device is a light sensor at a given position (x, y) receives a (ZN_SPEC) indicating that the (ZC) that transmitted the (ZN_SPEC) message is expecting a light sensor at position (x, y) to join the network, the light sensor should select that given (ZC) to continue the re-association.

In case the comparing results in that a pre-defined matching criteria is fulfilled an association or re-association a request message (RA_REQ) is sent (S4) 107 from the devices to the zone controllers (ZCs) where the pre-defined matching criteria was met. This (RA_REQ) message includes device description parameters and indicates a request from the devices to join the control zones controlled by said (ZCs).

In step (S5) 109, it is determined by the (ZCs) whether the device description parameters in the (RA_REQ) message match with the zone specific information included in the (ZN_SPEC) and based thereon it is decided whether or not to confirm the association of the device within its zone. During this stage, a given zone controller (ZC) may compare whether the device identifiers associated to the (RA_REQ) message that uniquely identifies a device match with a pre-defined list of device identifiers associated to the respective (ZCs), or compare whether the device identifiers associated to the (RA_REQ) message that uniquely identifies the device match with zone specific information associated to the respective (ZCs), or compare whether the type, capabilities and location information of the device associated to the (RA_REQ) message matches zone specific information associated to the respective (ZCs), or by counting the number of a given type and comparing the number of a number of devices of the same type expected to be zones, or a combination thereof. In case of a match, the (ZCs) may further issue and send a confirming or non-confirming message (RA_RSP) to the respective devices indicating whether the respective devices are confirmed or not.

Moreover, if any special security procedure (e.g. authentication) is required, the (ZC) may execute the security procedure before admitting the device. After a decision is taken, the (ZC) may respond to the device with a yes/no confirmation code in a Re-association Response message (RA_RSP). To ensure reliability, the (ZC) may set a bit in the (RA_RSP) message to indicate the device whether or not a device acknowledgment (DEV_ACK) is needed.

In one embodiment, the method further includes the step (S6) 111 of re-initializing the timer (ZC_REASSC_TIMER) window at the (ZCs) sides in case the devices associated at that point do not correspond to the devices expected to be in the zones controlled by the (ZCs) so a subsequent associating or re-associating process is performed. Therefore, if not all the devices that are expected to be in the zones controlled by the (ZCs) have been associated or re-associated, (ZC_REASSC_TIMER) window is re-opened and the associating or re-associating is repeated and in that way the (ZC) can expand the association or re-association window to allow any missing devices to properly associate or re-associate with the (ZC). A counter may be provided at the (ZCs) for counting the number of times the timer (ZC_REASSC_TIMER) window opened for keeping track of the number of times the re-association window is opened before all devices are successfully commissioned. In order to indentify commissioning errors in case devices do not successfully associate or re-associate within a given number of association windows specified by the (MAX_REASSC_RETRIES) count, a maximum counter number (MAX_REASSC_RETRIES) may be defined so that if the (ZC_REASSC_COUNTER) exceeds (MAX_REASSC_RETRIES) the process of associating or re-associating devices is terminated. This could trigger an error message that may be sent to a Building Management System (BMS) and/or be notified to a user via e.g. blinking a red light so as to help the user to identify the error situation. At this stage the respective (ZC) may return to said steps of re-initializing the timer (ZC_REASSC_TIMER) window or it may wait for commands from the (BMS) in order to fix the commissioning problem.

In one embodiment, said devices collect for a time period (ZC_SCAN_TIME) all received (ZN_SPEC) messages (S7) 113 prior to the step of comparing whether the zone specific information contained in the (ZN_SPEC) received by the devices includes device specific information that match with local device specific information associated to the devices. If the device does not receive any (ZN_SPEC) messages within the (ZC_SCAN_TIME) period it may broadcasts an association or re-association request message (RA_REQ) message including its device specific information.

In one embodiment, in case the respective devices are confirmed by said (RA_RSP) message sent by the (ZCs) (S8) 115 they respond by issuing an acknowledgement message (DEV_ACK) and send it back to the respective (ZCs) issuing said (RA_RSP). If no such (DEV_ACK) is received at the (ZCs) sides within a given time (DEV_ACK_TIMEOUT), the (ZCs) may assumes the re-association process for that specific device failed. The responding to the message sent by the (ZCs) (S8) could also be based on that the (ZCs) explicitly asks for such an acknowledgement, e.g. by setting a bit in the RA_RSP.

In one embodiment, if the devices are not confirmed within a given time (DEV_TIMEOUT) (S9) 117, i.e. if they do not receive any (RA_RSP) message sent by the (ZCs) they retransmit said (RE_REQ) up to a maximum number of times (MAX_REASSC_RETRY).

In one embodiment, said devices initialize a device associating or re-associating timer (DEV_REASSC_TIMER) window and a counter (DEV_REASSC_COUNTER) (S10) 119. The (DEV_REASSC_TIMER) indicates an association or re-association time window at the device side and the (DEV_REASSC_COUNTER) indicates the number of times the (DEV_REASSC_TIMER) window is initialized. Said step of collecting for the time period (ZC_SCAN_TIME) all received (ZN_SPEC) messages is preferably repeated while (DEV_REASSC_COUNTER) is less than said (MAX_REASSC_RETRY). In case the (DEV_REASSC_COUNTER) becomes greater that the (MAX_REASSC_RETRY) for a given device selected from said devices and the said devices have not been confirmed as associated with the right (ZC) by receiving a (RA_RSP) message with a positive confirmation, an association or re-association error message (ASSC_ERROR) is issued and associated to a request message (RA_REQ). This (RA_REQ) and the associated (ASSC_ERROR) message is either sent to a selected zone controller (ZC) or is sent as a broadcast if no (ZC) is known. In case the (ZC) or any other (ZC) selected from said (ZCs) receives said (RA_REQ) and (ASSC_ERROR) message the (ZC) grants a temporary association or re-association and sends a message indicating a temporal association or re-association (TEMP_GRANT), said error message (ASSC_ERROR) further being sent to a Building Management System (BMS) for notifying about said error. If a device receives a (RA-RSP) in response to its error report with the temporary association or re-association, e.g. via a (TEMP_GRANT) flag set, it should assume it is under temporary association and it should remain active waiting for further commands from the (BMS) or (ZC).

If the device receives a retry message (RA-RTY) while it is under a temporary association, it shall restart said re-association procedure. In one embodiment, this message may include information indicating which (ZC) the device should try to associate with. This will speed up the re-association process for that device.

In one embodiment, if however the device does not receive any response granting a temporary association after (MAX_REASSC_RETRY) attempts to report the error, it should assume it lost connectivity to the network and it may use any other external means to report the problem to the users, for instance, it may start emitting sounds or blinking (e.g. via LEDs) depending on the available capabilities.

The method is applicable to control systems for different types of buildings, automation lighting control, and energy management applications. Further, this method is also adopted by connectivity standards, such as ZigBee or other standards, as part of application layer auto-commissioning procedures.

A major benefit of the proposed invention is a scalable and flexible procedure to perform automatic association or re-association to complete the auto-commissioning of control zones. The proposed procedure may be adopted in different application scenarios (e.g. commercial buildings, homes, industrial environments, etc.), where the user could deploy the devices (ZCs), sensors, actuators, etc. and they would automatically form the network and the application control zones. The proposed method can recover from errors automatically and it provides error feedback to the user in case the error cannot be solved automatically. In order to optimize the system's performance, the user can optionally provide input to the control zone definition stage or to solve error situations, but the execution stages are completely autonomous.

Begin Example:

This example for message formats provides possible attributes for the messages used in the procedure described above. It should be noted that other attributes could be added as well.

Zone Specification (ZN-SPEC)

| ZN-SPEC{ | Type | Description |
|---|---|---|
| Zone_ID | Integer or String | Unique identifier of the control zone. This could be a number or a name. |
| Zone Controller ID | Integer | Address or name of the ZC. (If Zone ID uniquely identify the ZC, this attribute may not be needed) |
| ZC Location Information | TBD | This is the location coordinates of the ZC (this could be relative or absolute coordinates depending on the implementation). |
| Number of Zone Devices | Integer | Number of devices expected to join the Zone. |
| For each Zone Device{ | | List of device records that define the zone. |
| Device Type | Integer or string | Type of device<br>1 = light sensor<br>2 = occupancy sensor<br>3 = temperature sensor<br>4 = lighting actuator<br>5 = blinds controller<br>6 = HVAC controller<br>7 = etc. |
| Expected Location | TBD | This is the location coordinates of the device (this could be relative or absolute coordinates depending on the implementation). |
| Power operation mode | Integer | This indicates the type of power supply the device uses. Depending on the type of power supply the device may need special configuration from the ZC.<br>1 = Mains powered<br>2 = Battery powered<br>3 = Battery-less<br>4 = Battery powered with energy harvesting<br>5 = others. |

-continued

| ZN-SPEC{ | Type | Description |
|---|---|---|
| List of configuration attributes | List | This is a list of attributes that may differ for each type of device. For instance, for light sensors, the list could contain reporting interval, power save operation parameters, etc) |

Re-Association Request (RA-REQ)

| RA-REQ{ | Type | Description |
|---|---|---|
| Devive_ID | Integer or String | Unique identifier of the device This could be a number or a name. |
| Location Information | TBD | This is the location coordinates of the device (this could be relative or absolute coordinates depending on the implementation). |
| Device Type | Integer or string | Type of device<br>1 = light sensor<br>2 = occupancy sensor<br>3 = temperature sensor<br>4 = lighting actuator<br>5 = blinds controller<br>6 = HVAC controller<br>7 = etc. |
| Power operation mode | Integer | This indicates the type of power supply the device uses. Depending on the type of power supply the device may need special configuration from the ZC.<br>1 = Mains powered<br>2 = Battery powered<br>3 = Battery-less<br>4 = Battery powered with energy harvesting<br>5 = others. |
| List of configuration attributes | List of attributes | This is a list of attributes that may differ for each type of device. For instance, for light sensors, the list could contain reporting interval, power save operation parameters, etc) |
| ASCC_ERROR | Boolean | 0 = no error<br>1 = Commissioning error |
| Transaction code | Integer | A code that identifies every new transaction involving a RA-REQ. |

Re-Association Response (RA-RSP)

| RA-RSP{ | Type | Description |
|---|---|---|
| Zone_ID | Integer or String | Unique identifier of the control zone. This could be a number or a name. |
| Zone Controller ID | Integer | Address or name of the ZC. (If Zone ID uniquely identify the ZC, this attribute may not be needed) |
| Device ID | Integer or String | Destination device of the response message. |
| Transaction Code | Integer | This identifies a transaction initiated by a device. This should be the same code as in the RA-REQ that originated this RA-RSP. If this message is not originated in response to a previous request, this field should be set to zero. |
| Confirmation Code | Boolean | 0 = (yes) Association denied<br>1 = (no) Association confirmed |
| TEMP_GRANT | Boolean | If (1) indicates this is a temporary grant to the device, which should continue in active more waiting for more information. |

| RA-RSP{ | Type | Description |
|---|---|---|
| List of configuration attributes | List | This is a list of attributes that may differ for each type of device. For instance, for light sensors, the list could contain reporting interval, power save operation parameters, etc). The ZC can use this list to configure attributes at the device side. |

Re-Association Retry (RA-RTY)

| RA-RTY{ | Type | Description |
|---|---|---|
| Zone_ID | Integer or String | Unique identifier of the control zone. This could be a number or a name. |
| Zone Controller ID | Integer | Address or name of the ZC. (If Zone ID uniquely identify the ZC, this attribute may not be needed) |
| Device ID | Integer or String | Destination device of the response message. |
| Transaction Code | Integer | This identifies a transaction initiated by a device. This should be the same code as in the RA-REQ that originated this RA-RSP. If this message is not originated in response to a previous request, this field should be set to zero. |
| Confirmation Code | Boolean | 0 = (yes) Association denied<br>1 = (no) Association confirmed |
| List of Candidate ZCs | List of Integer or String | This is a list of candidate ZCs the device should try to associate with. |

Figure 3:
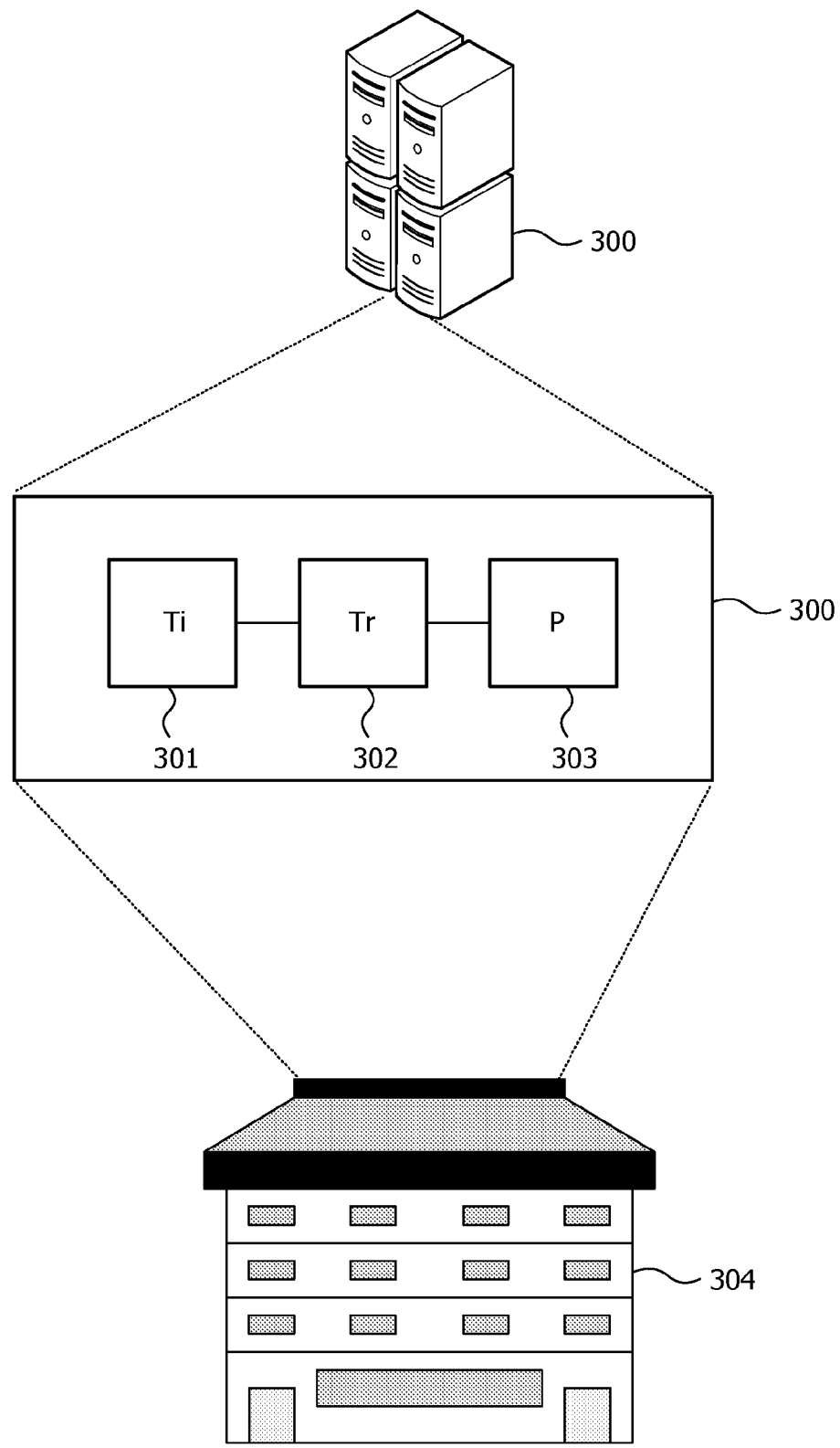
FIG. 3 shows a system for associating or re-associating devices in a control network including control zones to respective zone controllers (ZCs) controlling the control zones.

End Example:

FIG. 3 shows a system 300 for associating or re-associating devices in a control network including control zones to respective zone controllers (ZCs) controlling the control zones, where the system comprises a timer (Ti) 301, a transmitter (Tr) 302 and a processor (P) 303. The system 300 is as an example a part of a Central Building Control and Management System (CBCMS) for monitoring, controlling and managing building 304 operation at the highest level. The system 300 can also be used for sub-systems that allow only building-wide control, e.g. some HVAC (Heating Ventilation and Air Conditioning) components (boiler, chiller, pumps, etc. . . . ), lighting schedules, etc. in buildings 304. The system 300 can also be control software running on a central management station.

The timer (Ti 301) is adapted to initialize an associating or re-associating timer (ZC_REASSC_TIMER) window at the (ZCs) defining the time during which said associating or re-associating of the devices takes place.

The transmitter (Tr) 302 is adapted to transmit during the (ZC_REASSC_TIMER) window zone specific information (ZN_SPEC) message, where the (ZN_SPEC) message including information about the devices expected to be in the zones controlled by the (ZCs).

The processor (P) 303 is adapted to compare whether the zone specific information contained in the (ZN_SPEC) received by said devices includes device specific information that match with local device specific information associated to the devices, where in case the comparing results in that a pre-defined matching criteria is fulfilled.

The transmitter (Tr) 302 is further adapted to send an association or re-association request message (RA_REQ) from said devices to the zone controllers (ZCs) where said pre-defined matching criteria was met, the (RA_REQ) message including device description parameters and indicates a request from the devices to join the control zones controlled by said (ZCs).

The processor (P) 303 is further adapted to determine whether the association or re-association of the respective devices is to be confirmed by means of comparing, by the respective (ZCs) receiving said (RA_REQ) message, the device description parameters included in the (RA_REQ) message match with zone specific information included in the (ZN_SPEC).

Further details in relation to the steps performed by the timer (Ti 301), the transmitter (Tr) 302 and the processor (P) 303 are described in relation to FIG. 2.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A method of associating or re-associating devices in a control network including control zones to respective zone controllers (ZCs) controlling the control zones, comprising:
   initializing an associating or re-associating timer (ZC_REASSC_TIMER) window at the (ZCs) defining the time during which said associating or re-associating of the devices takes place (101);
   transmitting during the (ZC_REASSC_TIMER) window zone specific information (ZN_SPEC) message, the (ZN_SPEC) message including information about the devices expected to be in the zones controlled by the (ZCs) (103),
   comparing whether the zone specific information contained in the (ZN_SPEC) message received by said devices includes device specific information that match with local device specific information associated to the devices, where in case the comparing results in that a pre-defined matching criteria is fulfilled (105);
   sending an association or re-association request message (RA_REQ) from said devices to the zone controllers (ZCs) where said pre-defined matching criteria was met, the (RA_REQ) message including device description parameters and indicates a request from the devices to join the control zones controlled by said (ZCs) (107), and
   determining whether the association or re-association of the respective devices is to be confirmed by means of comparing, by the respective (ZCs) receiving said (RA_REQ) message, the device description parameters included in the (RA_REQ) message match with zone specific information included in the (ZN_SPEC) message (109).

2. A method according to claim 1, the step of determining whether the association or re-association of the respective devices is to be confirmed includes checking whether the devices that responded to said (ZN_SPEC) message are indeed the devices expected to be in the zones controlled by the (ZCs), wherein in case said devices do not correspond to the devices expected to be in the zones controlled by the (ZCs) when the (ZC_REASSC_TIMER) expires said timer (ZC_REASSC_TIMER) window is re-initialized and a subsequent associating or re-associating process is performed (111), the method further comprising initializing a counter (ZC_REASSC_COUNTER) for counting the number of times said timer (ZC_REASSC_TIMER) window opened.

3. A method according to claim 2, wherein said step of checking whether the devices that responded to said (ZN_SPEC) message are indeed the devices expected to be in the zones controlled by the (ZCs) comprises:
   comparing device identifiers associated to the (RA_REQ) message that uniquely identifies the devices match with a pre-defined list of device identifiers associated to the respective (ZCs), or
   comparing device identifiers associated to the (RA_REQ) message that uniquely identifies the devices match with zone specific information associated to the respective (ZCs),
   checking whether the type, capabilities and location information of the device associated to the (RA_REQ) message matches zone specific information associated to the respective (ZCs), or
   counting the number of a given type and comparing the number of a number of devices of the same type expected to be zones, or
   a combination thereof.

4. A method according to claim 2, further comprising defining a maximum counter number (MAX_REASSC_RETRIES), where in case said (ZC_REASSC_COUNTER) exceeds (MAX_REASSC_RETRIES) the process of associating or re-associating devices is terminated.

5. A method according to claim 4, wherein in case the (ZC_REASSC_COUNTER) exceeds (MAX_REASSC_RETRIES) and the expected devices to be in the zone have not successfully associated the respective (ZCs), the (ZCs) assume a commissioning error has occurred and report the error code to a Building Management System (BMS) and/or indicate to a user that an error has occurred.

6. A method according to claim 1, wherein the step of initializing an associating or re-associating timer (ZC_REASSC_TIMER) window is performed periodically so as to allow new devices to associate or existing device to re-associate.

7. A method according to claim 1, wherein said devices collect for a time period (ZC_SCAN_TIME) all received (ZN_SPEC) messages (113) prior to said step of comparing whether the zone specific information contained in the (ZN_SPEC) message received by said devices includes device specific information that match with local device specific information associated to the devices.

8. A method according to claim 7, wherein if a given device does not receive any (ZN_SPEC) messages within said (ZC_SCAN_TIME) period it broadcasts an association or re-association request message (RA_REQ) message including its own device specific information.

9. A method according to claim 1, further comprising issuing and sending a confirming or non-confirming message (RA_RSP) by the (ZCs) to the respective devices that previously sent the (RA_REQ) message to the (ZCs) indicating whether the respective devices are confirmed or not, where in case the respective devices are confirmed they respond by issuing an acknowledgement message (DEV_ACK) and send it back to the respective (ZCs) issuing said (RA_RSP) (115).

10. A method according to claim 9, wherein in case the (DEV_ACK) is not received within a given time (DEV_ACK_TIMEOUT) (117), the (ZC) assumes the re-association process for that specific device failed.

11. A method according to claim 10, wherein in case the respective devices are not confirmed within a given time (DEV_TIMEOUT) by the respective (ZCs) they re-transmit said (RA_REQ) up to a maximum number of times (MAX_REASSC_RETRY).

12. A method according to claim 8, wherein said devices initialize a device associating or re-associating timer (DEV_REASSC_TIMER) window and a counter (DEV_REASSC_COUNTER) (119), the (DEV_REASSC_TIMER) indicating an association or re-association time window at the device side and the (DEV_REASSC_COUNTER) indicates the number of times the (DEV_REASSC_TIMER) window is initialized, said step of collecting for the time period (ZC_SCAN_TIME) all received (ZN_SPEC) messages and following association attempt including transmission of (RA_REQ) being repeated while (DEV_REASSC_COUNTER) is less than said (MAX_REASSC_RETRY).

13. A method according to claim 12, wherein if said (DEV_REASSC_COUNTER) becomes greater that said (MAX_REASSC_RETRY) for a given device selected from said devices and the device has not yet successfully associated with a (ZC), an association or re-association error message (ASSC_ERROR) is issued and associated to a request message (RA_REQ), where the (RA_REQ) and the associated (ASSC_ERROR) message is either sent to a selected zone controller (ZC) or is sent as a broadcast if no (ZC) is known, where in case the selected (ZC) from said associating device or any other (ZC) receives said (RA_REQ) and (ASSC_ERROR) message, the (ZC) grants a temporary association or re-association to said device and sends a message indicating a temporal association or re-association (TEMP_GRANT) to said associating device, said error message (ASSC_ERROR) further being sent to a Building Management System (BMS) for notifying about said error.

14. A computer-readable, non-transitory medium having stored therein instructions for causing a processing unit to execute the method according to claim 1.

15. A system (300) for associating or re-associating devices in a control network including control zones (201-206) to respective zone controllers (ZCs) (207-210) controlling the control zones, comprising:
- a timer (301) for initializing an associating or re-associating timer (ZC_REASSC_TIMER) window at the (ZCs) defining the time during which said associating or re-associating of the devices takes place;
- a transmitter (302) for transmitting during the (ZC_REASSC_TIMER) window zone specific information (ZN_SPEC) message, the (ZN_SPEC) message including information about the devices expected to be in the zones controlled by the (ZCs),
- a processor (303) for comparing whether the zone specific information contained in the (ZN_SPEC) message received by said devices includes device specific information that match with local device specific information associated to the devices, where in case the comparing results in that a pre-defined matching criteria is fulfilled;
- a transmitter (302) for sending an association or re-association request message (RA_REQ) from said devices to the zone controllers (ZCs) where said pre-defined matching criteria was met, the (RA_REQ) message including device description parameters and indicates a request from the devices to join the control zones controlled by said (ZCs), and
- a processor (303) for determining whether the association or re-association of the respective devices is to be confirmed by means of comparing, by the respective (ZCs) receiving said (RA_REQ) message, the device description parameters included in the (RA_REQ) message match with zone specific information included in the (ZN_SPEC) message.

* * * * *